United States Patent Office 3,405,920
Patented Oct. 15, 1968

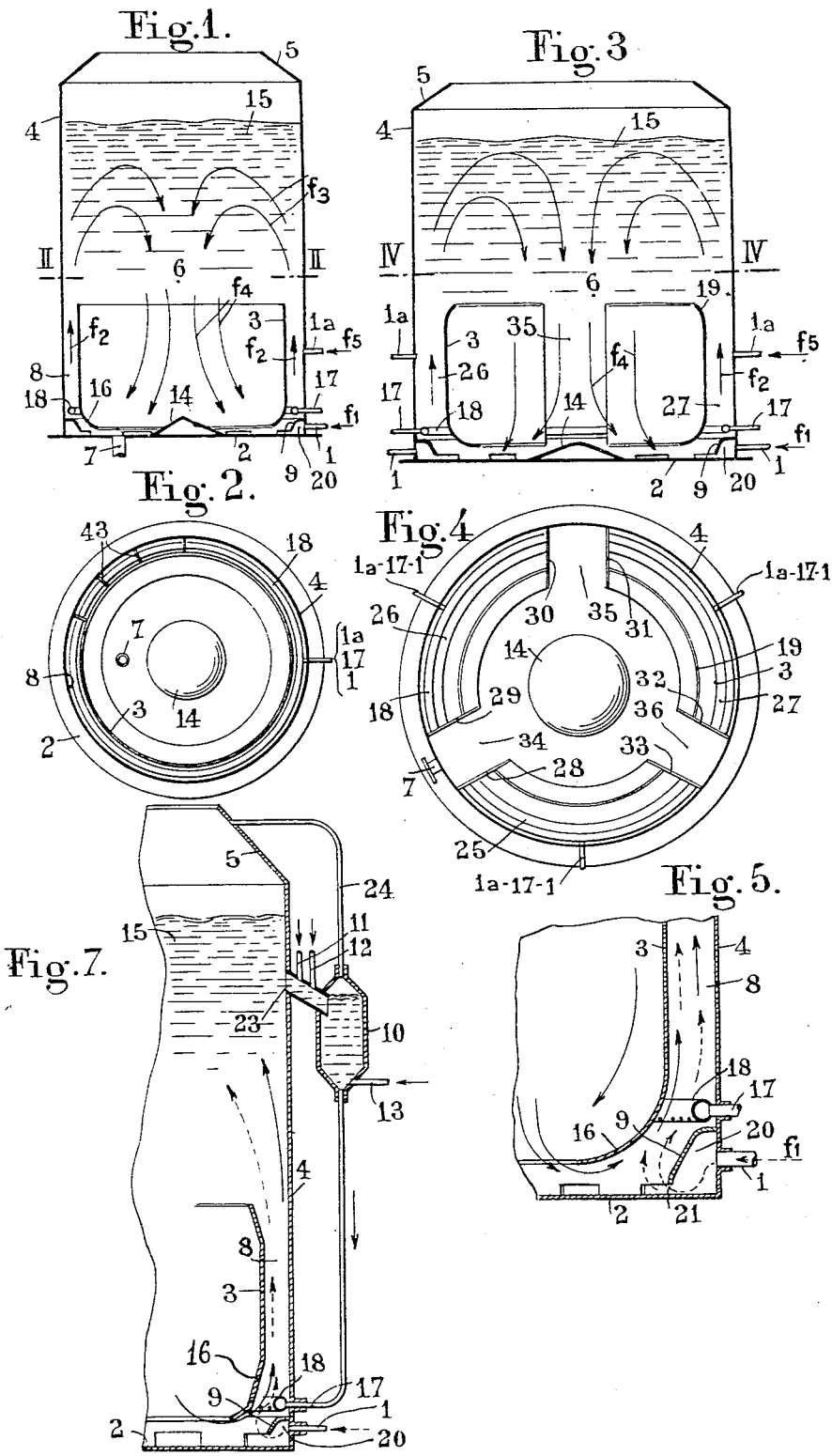

3,405,920
PROCESS AND DEVICE FOR STIRRING AND METHODICALLY CIRCULATING LIQUID MASSES BY BLOWING GASES THERETHROUGH
Louis Alfred Auguste Lefrancois, 24 Rue Barbet de Jouy, Paris, France,
Filed July 30, 1964, Ser. No. 386,329
Claims priority, application France, Aug. 12, 1963, 944,438
13 Claims. (Cl. 261—123)

ABSTRACT OF THE DISCLOSURE

The gas is blown into the liquid mass at the base and near the outer periphery thereof and is distributed as uniformly as possible along said periphery where a liquid-gas emulsion is formed; the movement of the liquid mass takes place upwards at the periphery and downwards in the central zone. The device comprises a vat with an inner partition a little spaced from the bottom of the vat and extending approximately in the lower half of the vat coaxially to the vat lateral main wall; said partition forms with said vat lateral wall a relatively narrow annular duct; gas outlets for delivering gas under pressure are uniformly distributed at the bottom of said duct.

This invention relates essentially to the stirring of liquids by means of gases reacting or not with the products to be stirred, said gases being blown through the liquid masses containing or not in admixture, suspension, emulsion or solution gaseous, liquid or insoluble products reacting or not with one another and with said liquid masses.

This invention is concerned with a stirring process of this character even if a mechanical stirring device is added thereto. However, as a rule, this invention does not require the use of such mechanical devices.

The present invention is applicable notably when the gas blown through the liquid mass has a positive or negative function during the process of mixing the products to be treated, this constituting an additional reason for adopting the stirring system of this invention. However, it is a frequent occurrence that, from the mechanical point of view alone, the stirring of liquids by gas blowing, which is the primary object of this invention, constitutes a more interesting proposition, for example when it is desired to have a methodical circulation or a periodic recurrence thereof, which is likely to improve the emulsification, or in some other cases. Its use is always characterized by a considerable simplicity and requires but low-cost equipment.

This stirring system is particularly useful in the case of fermentations. Thus, for instance, it is advantageously applicable to the stirring of the contents of alcoholic fermentation vats by blowing back into these vats the carbon dioxide gas issuing from the fermentable reducing agents.

However, this system was used more particularly in aërobic fermentation vats, especially in the major number of vats in which the feed yeasts are prepared, and also for cleaning purposes by means of yeasts or other micro-organisms from various residuary waters.

A process known and patented among many others consists in blowing air into the central portion of the bottom of a vat, the resulting emulsion rising vertically, due to the density difference, above the outlets of the blowing device in the form of a column directed or guided by a vertical cylinder of adequate dimensions; this arrangement produces an efficient methodical circulation of the emulsion which rises in the center and returns to the bottom in the surrounding annular space; this circulation permits of using various methods facilitating the feeding of the vat, improving the drawing-off of liquid or emulsion, controlling the foam consistency, etc. By properly calculating the dimensions of the fixed component elements of the vat the power consumption may be reduced considerably.

Gas blowing devices of this general character have stood the test of practical experience or have been proposed for applications differing as widely as the preparation of micro-organisms or the washing of insoluble solid products.

However, the development of certain industries such as the production of proteins or the increasing requirements concerning the purification of residuary waters and, generally speaking, recent industrial improvements, require plants of increasingly larger size, thus leading to the construction of vats of increasing dimensions, in order to avoid an abnormally costly multiplication of the working units.

In many cases it is hardly possible to increase the height of the vats. This applies notably to aërobic fermentation vats operating with an organic medium; for various known physical and biological reasons the optimum heights is set at a value, differring by two to six feet more or less in each case, controlled by the conditions in which the emulsion is to be carried out. Thus, fermentation vats of greater and greater diameter have been constructed.

The above-mentioned device is attended in this case by costly requirements in connection with its constructional strength, the necessity of maintaining at all points the various characteristics of the mass of product being worked, the cooling of this mass, etc.

The applicant found that these difficulties could be overcome by causing the liquid mass to circulate in a direction opposite to that hitherto advocated for the mass of product being worked, and also by calculating the circulation factors in a different manner. Moreover, in practice a few additional advantageous features appeared. In the case of large-diameter vats, these are stronger for a same plate thickness.

According to this invention the gas is blown through the liquid mass at the bottom and in the vicinity of the outer periphery thereof, by distributing said gas as uniformly as possible around this periphery, whereby the liquid mass thus circulated moves upwards at the periphery and downwards in the center of the vat. Preferably, the resulting emulsion constitutes an annular ascending sheet at the outer periphery of said liquid mass, said sheet pouring continuously at the upper portion of said liquid mass into the central portion thereof.

The fineness of the gas distribution is not critical, but the speed at which this gas is introduced should exceed preferably 30 ft./sec., however speeds in excess of 75 ft./sec. are not required.

The emulsion, instead of being directed bodily as a single annular ascending sheet may be divided into a plurality of sections or sectors of annular ascending sheet distributed all over the outer periphery of the liquid mass.

The downward rate of flow in the central portion of the liquid mass is inferior to the upward rate of flow at the periphery thereof.

If the liquid is of the foaming type a gas-liquid mixture having a substantially constant average density builds up very rapidly, thus definitely avoiding the use of antifoam agents. The density of this mixture varies very little during its circulation, considering the variable gas compression.

When the liquid mass is treated continuously it is drawn off and fed in continuously and the delivery of fresh liquid should be distributed along its periphery slightly above the gas outlets and caused to contact the blown gas, in the zone of initial and tumultuous ascension of said gas, so that the liquid supply is distributed homogeneously immediately as it enters the liquid mass.

A secondary gas may be blown with the same characteristics as the main blowing action but this secondary gas will preferably be blown at a slightly higher level than the primary gas into the ascending annular sheet.

It is another object of this invention to provide a device for carrying out the method set forth hereinabove.

The device according to this invention consists of a vat comprising, approximately in its lower half, an inner partition coaxial and connected to the main lateral wall of the vat, said coaxial inner partition being so spaced from its concentric main lateral wall that an annular space or duct is formed between the two walls, the lower portion of the inner wall being curved inwards and downwards, and overlying the vat bottom so that its edge lies at a relatively short distance therefrom, a pressure gas delivery device opening into the base of said annular space or duct through blowing outlet orifices the arrangement and dimensions of which are calculated to introduce the same amount of gas per linear foot or yard of the vat periphery.

Various types of gas blowing devices may be used for carrying out this invention. Thus, a perforated annular member disposed inside the vat, or many nozzles connected to a manifold disposed externally of the vat, etc., may be contemplated. According to a specific form of embodiment, a pipe line delivering gas under pressure is connected to the bottom of the vat and opens into an annular space formed along the perimeter of this bottom by a section member connecting the lateral wall of the vat to its bottom wall, inside said annular space or duct, this section being formed along its edge connected to the bottom wall with orifices permitting the blowing of gas into said duct, said orifices being disposed at spaced intervals along the section and dimensioned to permit the passage of the same quantity of gas per linear foot or yard of the vat perimeter.

The inner wall or partition may be secured to the lateral wall of the vat by means of flat vertical members. Its curved lower edge is intended to facilitate the passage of the circulating liquid mass from the center of the vat to said annular duct in which it is carried along or drawn by the blown gas.

The height of the inner partition or wall varies as a function of the consistency of the medium; thus, it ranges as a rule from 13 to 20 feet in the case of a vat having a useful height of about 30 to 50 feet, respectively. The gap left between the lateral wall of the vat and said inner partition to constitute said annular duct varies similarly as a function of the consistency of the medium and ranges from about 6% to about 14% of the transverse dimensions of the vat, in most cases from about 6% to about 10%.

The lateral wall of the vat and the inner partition thereof may be cylindrical or prismatic, or slightly tapered or pyramidal.

When the vat is operated with a continuous process, it comprises on the one hand a drawing-off pipe line connected to the vat bottom or to a point located in the vicinity of this bottom, and on the other hand a feed device adapted to ensure a uniform distribution of the different liquids or fluids all around the vat into said annular duct, above the gas blowing zone and in the region of tumultuous ascension of the gaseous stream.

The fluid feed may be distributed by means of a perforated annular member or any other known and suitable means such as spouts, ramps, gauged orifices, nozzles, atomizers, etc.

The inner wall or partition of the vat may be divided into a plurality of sectors having their ends connected by vertical elements to the main lateral wall of the vat, whereby the annular duct formed between the inner partition and the lateral wall of the vat is divided into a plurality of sections and the spaces formed between these sections communicate directly with the central region of the vat and correspond to a developed length of the main wall of the vat which ranges from 3 to 10 feet according to the vat diameter. The distance between the lateral wall and the inner wall sections is slightly greater than the above-stated value in the case of a continuous inner wall. The gas-blowing and liquid-feed devices are the same as those described hereinabove except that they are reduced to segments in each annular duct sector.

It is advantageous to streamline all the surfaces intended for guiding the circulating liquid mass in order to reduce pressure losses, notably at changes of direction so as to smooth out speed changes and preserve the homogeneity of the liquid mass at all points. Thus, the inner partition of the vat, which has its lower edge curved inwards and downwards, may also have its upper edge curved inwards and upwards; besides, the section defining the annular space in which the gas is introduced has a face inclined inwards and downwards which registers with the base of the inner partition, and finally the center of the vat bottom may have a conical configuration with a rounded vertex and a rounded circular edge merging into the vat bottom.

One or more secondary gas blowing lines may be connected to the vat so as to open above the primary gas lines. If desired, these additional lines may feed an annular distributor disposed externally on the outer main wall of the vat, or sections of this distributor which register with corresponding sections of said annular duct.

Since the velocity of the moving mass of fluid is maximum along the major surfaces of the vat, that is, the main lateral wall and the inner partition, when this mass is subjected to a strongly exothermic reaction it will be cooled by these surfaces contacting the liquid. If a simple external cooling with or without liquid streaming is not sufficient the two outer and inner walls aforesaid may be constructed partly or completely as hollow structures or jackets in which a suitable cooling fluid is circulated under pressure.

This invention is also concerned with devices consisting of a plurality of vats of the type set forth hereinabove which communicate with one another at their top or bottom, as well as devices wherein one or a plurality of vats such as the one described hereinabove are associated with vats of a different type. Thus, plants, devices and apparatus may be obtained of which the capacity may be increased or reduced at will. The fluid to be treated will flow through all the compartments constituted by these assembled vats along paths adapted to yield the best possible result, the parameters or factors of the process being adjusted automatically so as to be either the same for all vats or different from one vat to another, according to the purposes contemplated.

Specific forms of embodiment of the device according to this invention will now be described with reference to the accompanying diagrammatic drawings in which:

FIGURE 1 is a diagrammatic vertical axial section showing a first form of embodiment of a vat constructed according to the teachings of this invention;

FIGURE 2 is a section taken upon the line II—II of FIGURE 1;

FIGURE 3 is a diagrammatic vertical axial section showing an alternate form of embodiment of the vat;

FIGURE 4 is a sectional view taken upon the line IV—IV of FIGURE 3;

FIGURES 5 and 6 are detail views showing on a larger scale and in vertical section vats of the type illustrated in FIGURES 1 and 3, respectively;

FIGURE 7 is a fragmentary vertical axial section showing on a larger scale an alternate form of embodiment of a vat according to this invention;

Figure 8:
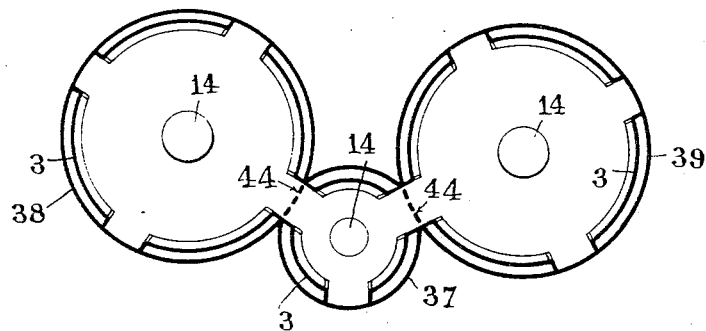
FIGURES 8 and 9 are diagrammatic horizontal sections showing two different arrangements of the devices according to this invention.

The following description is given by way of example and should not be construed as limiting the invention.

It relates to a specific application of this invention to the field of an aërobic development or growth of micro-organisms in adequate media. The principles and suggestions set forth herein are applicable, with changes and variations obvious to anybody skilled in the art, to many other technical fields without departing from the spirit and scope of the invention.

The air blown through the inlet pipe 1 in the direction of the arrow $f_1$ is introduced into and near the bottom 2 of a vat 4 containing the fermentable medium 15 to be stirred and treated. No advantage is to be sought in producing a so-called "fine blowing" action.

The ascending column of emulsified liquid rises along the outer wall as shown by the arrows $f_2$; it is protected from the descending mass by a vertical cylinder or prism 3 coaxial to said vertical wall of the vat which has a circular or polygonal cross-sectional contour. The lower edge 16 of this inner partition is curved inwards and downwards, substantially according to the broken line contour illustrated in FIGURE 7. Its upper edge 19 may also be curved inwards and upwards (see FIGURES 2 and 7). This inner partition 3 provides an annular space or duct 8 adapted to permit the "guiding" of the emulsified medium while preventing any descending movement thereof.

The inner partition 3 is connected to the main outer vertical wall of the vat, for example by being suspended therefrom by means of sheet-metal or thin plate elements which, while reinforcing this inner partition, increase the strength of the vat structure as a whole. These elements extend vertically, and only some of them are illustrated at 43 in FIGURE 2 in order not to complicate or overburden the drawing.

Thus, the vat construction has no tie-rods, bracing member or tubular elements, and is substantially free of any internal equipment, outside the cylinder 3. Therefore, it can be constructed at a relatively low cost, and in addition the fermentable mass is more homogeneous and uniform, and the foam circulation is improved considerably.

The emulsified mass follows the path shown by the arrows $f_3$ and $f_4$, by converging towards the center of the vat and subsequently descending in this central region, thus limiting the upper level of the emulsion. This centripetal movement takes place naturally but may be assisted if desired by the frustoconical contour of the upper edge 5 of the fermentation vat; this contour is advantageous but not necessary, for the convection effect is observed also with a vat having a uniform vertical outer wall throughout.

In the central zone 6 of the vat the emulsified mass moves downwards and is subsequently drawn again under the lever edge 16 of cylinder 3. To guide the emulsion flow down the central zone 6 and avoid the formation of any eddy-current the central portion of the vat bottom, instead of being flat, comprises advantageously a conical member 14 having a vertical axis and a relatively wide angle, with a rounded vertex and a lower circular edge merging into the bottom wall 2 through a curved fillet, as shown in FIGURE 3.

The supply of liquid to the vat 4 by means of the feed line 17 must be effected very uniformly all around the vat, for example by providing a pipe substantially in the form of a perforated ring 18 disposed preferably in close vicinity of the air outlets. The vat content is drawn off at any desired level but it appears that the most rational solution consists in drawing off the emulsion from the bottom of the vat (FIGURE 1) or close to this bottom (FIG. 2) at 7; however, these arrangements should not be construed as limiting the present invention. If desired, one drawing-off outlet or a plurality of drawing-off outlets may be provided.

The air blowing devices may vary considerably in design and relative arrangement, provided that the compressed gas or air is distributed in substantially equal amounts all around the wall so as to carry along the liquid mass in the annular cylindrical duct 8 formed between the inner partition or cylinder 3 and the main outer wall of the vat 4.

According to a specific and exemplary form of embodiment of this invention an annular space 20 shown on a larger scale in FIGURE 5 is formed in the bottom of the vat and of the outer wall thereof. This annular space is filled with air (circulating along the path shown by the dashed arrows) due to the pressure head of the mass being worked, plus the moderate loss of pressure caused by the injection of air into the vat, which is but one or two inches of Hg. The contour 9 of the sheet-metal wall provided between the annular space 20 filled with air and the emulsified liquid is calculated with a view to reduce as much as possible the losses of pressure which the emulsion is to undergo as it enters the space 8. The plate 9 has orifices 21 formed in its lower portion and the air (dashed arrows) penetrates through these orifices into the emulsion at a velocity ranging from 33 to 75 ft./sec. These orifices may have the shape of rectangular ports, or consist of slots obtained by fastening the plate 9 by means of gauged flat liners, whether rigid or elastic (in which case the tensions are calculated and measurable), but simple holes may also be used for this purpose. These orifices may have a cross-sectional area of about 0.1 to 1 sq. in., without any inconvenience, provided that their height is relatively small.

The length of the solid portion between adjacent orifices 21 may vary as a function of their shape and may exceed one or two inches. The chief requirement in this construction is that the quantity of air that can be blown through these orifices is constantly the same for each linear yard, or even for each linear foot, of the vat periphery. This requirement can be met without difficulty if the vat bottom is horizontal, if the mean pressure of the air blown into the vat through each orifice has a constant, uniform value, and if the amplitude of the periodic irregularities due to the "surges" are automatically of low value, as confirmed by practical tests.

Besides, if the air is properly distributed and the velocity requirements are properly adhered to, any equivalent arrangement, even in the form of a simple perforated ring, may be used for carrying out this invention.

Figure 6:
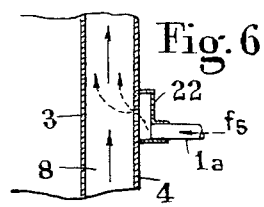

The applicant also contemplates the possibility of blowing air at a higher level than the bottom of the vat, for example at $f_5$ (FIGURES 1, 3 and 6) in certain cases allowing a reduction in power consumption, while ensuring a sufficient circulation, provided that the principle of circulation and stirring of the medium which constitutes the basis of this invention is adhered to. Thus, air penetrates into the space 8 at $1a$ and is also very uniformly distributed as already explained in connection with the air blowing device 1. Any air-blowing method and means may be used to this end. Thus, a horizontal air-blowing ring 22 may be disposed externally of the vat as shown in FIGURE 6 so that it will not interfere with the ascension of the liquid mass in the annular duct or space 8. In certain cases one may simply use a circular perforated tube disposed horizontally in the aforesaid annular space 8. The applicant therefore reserves the possibility of using an air blowing system of the type shown at $1a$ to produce an auxiliary or secondary air supply, whether momentary or permanent, in addition to the normal or primary air supply system shown at 1 near or at the bottom of the vat.

The vat is fed for continuous or batchwise operation after the various ingredients to be introduced into the vat at 11, 12 and 13 have been properly mixed, in a mixing device 10 associated with the vat as shown for example in FIGURE 7. Certain other elements or ingredients, on account of their pH or merely for simplification purposes, may be introduced directly into the vat, without departing from the basic principles of this invention.

Although this auxiliary mixer 10 is not considered as an essential requirement for properly carrying out the method of this invention, it is attended by the additional advantage that it permits of either adding and mixing with the vat supply, which in the case considered herein has a high food value, a certain proportion of foam having a high content of micro-organisms which is taken from the top of the vat at 23, or recycling into said mixer the same micro-organisms but taken from another device, according to cases and circumstances.

This auxiliary mixer 10 of which FIGURE 7 illustrates a typical but non-limiting example may be single or multiple according to the vat dimensions, the characteristics of the site and/or operation, and any other cause.

A pipe line 24 may connect the top of the auxiliary mixer 10 to the top of vat 4 for cleaning the vat and notably remove the excess foam therefrom when necessary.

To form all these mixtures and as a rule all operations concerning the feeding of the fermentation apparatus according to this invention, devices such as pumps, agitators, atomizers, emulsifiers or any other known and adequate devices may be used without departing from the basic principle of this invention. This invention contemplates essentially the possibility of distributing the feed material or materials at a great number of supply points into the mass to be treated and requires therefore that this supply be evenly or uniformly distributed every linear foot or yard of the peripheral development of the vat concerned. Thus, for instance, a circular overflow spout or a perforated hollow ring of the type shown at 18 may be used, provided that the above-defined requirement is properly met. Of course, in this example, the means designated by the reference numeral 18 should not be construed as limiting the invention.

It is particularly easy to cool a vat of the type disclosed hereinabove. The coefficient of heat transfer between an emulsion subjected to a whirling motion and having a relatively high linear speed, on the one hand, and a cooling agent having the same characteristics, on the other hand, constitutes one of the best propositions in this respect. The increase in the vat diameter obviously reduces the surface to volume ratio, but in the case of stirred-emulsion vats the whole vertical main wall of the vat, from top to bottom, is heat-absorbent and in the vat constituting the subject-matter of his invention it is the dissipation of heat from the outer wall that matters. Since the vats are always erected in the open, irrespective of the climate, air may be sufficient to this end. Should air-cooling be considered as not sufficient for the purposes contemplated, streaming water on the external surface of the outer wall will prove satisfactory in most applications. If in certain specific cases this cooling method were not deemed sufficient, part or the whole of the outer wall will be cooled by resorting to a forced water circulation within a water jacket, the outer wall of this jacket consisting of thin plates of metal or a more convenient material, the cooling water being guided at high speed either by small sections welded on the wall of the vat structure, or by grooves formed by construction, such as by pressing, rolling, etc. Finally, in extreme cases the cooling action may be increased by providing a double-walled or jacketed inner partition in which a forced circulation of cooling medium is maintained, this relatively great surface area being formed on the aforesaid inner cylindrical or prismatic partition 3.

If desired, the vat may be closed at the top by a cover or dome adapted to permit the escape of gas. However, experience teaches that in most cases this cover may be dispensed with or substituted by the frustoconical marginal member 5 obtained by folding inwards and upwards the upper edge of the upper cylindrical section of the outer wall of the vat. The gas is exhausted at a higher rate, the top of the vat is reinforced and finally the streaming of cooling water is also facilitated.

An alternate form of embodiment of the vat described hereinabove may be constructed as shown in FIGURES 3 and 4 of the drawings; if desired, the relative spacing between the lateral wall of the vat 4 and the inner cylindrical or prismatic wall 3 may be increased for constructional reasons or with a view to reduce pressure losses, or for any other reason. To avoid unduly increasing the horizontal cross-sectional area of the annular space or duct 8, the annular volume is then divided by vertical partitions such as 28 to 33 into a plurality of annular sections such as 25 to 27, mostly of same magnitude, spaced from one another, and ranging from two to four in number in most instances. Two or more vertical passages such as 34 to 36 are thus formed between adjacent sections, and no blowing or feeding is provided in these passages. Under these conditions, the volume of these passages will form an integral part of the volume 6 in which the emulsified mass has a general descending movement.

FIGURE 4 shows diagrammatically in plan view a vat of this character designed for the production of yeast. The vat has a 31-foot diameter and a vertical height of about 46 feet, with a 40-inch high conical cover at the top. The bottom is flat, except for the central cone 14. As in most cases the structure comprises three equal annular cylinder elements 25 to 27 spaced 35° from each other, thus giving a total developed length of about 70 feet along the vat wall. The inner wall 3 of apparently cylindrical configuration in this example actually has a polygonal cross-section with fifteen flat lateral faces. The height of this inner wall 3 is about 18 feet, with a free gap of about 15⅓″ at the bottom. The area of the horizontal cross-section of each element is about 40 sq. ft. The diameter of cone 14 is about 80 inches at the base and the cone height is about 40 inches.

Air is blown at the rate of about 350,000 cu. ft./hr. into the vat through three pipe lines 1 in the direction of the arrows $f_1$.

The inlets for the blown air and for supplying the liquid material to be treated are of the type described hereinabove with a single mixer 10 the effluent of which is divided into equal streams in three annular cylindrical sectors 25 to 27 by three pipe lines or ducts 17.

Known means forming no part of this invention are also provided for properly and uniformly distributing the air and all the feed materials within the annular cylinder sectors under the same conditions as in the case of a complete cylindrical annulus.

The unions and connectors for measuring the temperature, the pH value, for sampling purposes, as well as the inspection holes, windows, etc., are provided in the vat wall between the aforesaid sectors.

This invention also makes it possible to construct as an organized unit the combination of a plurality of vats, their number being as great as necessary for obtaining a single fermentation apparatus of unlimited useful volume the operation of which may be devised with a view not only to combine the automatic controls of the various parameters or factors of the fermentation in each vat, but also to produce different treatments, in one or several vats, of the mass flowing in the proper sequence or according to the desired process in each vat. Thus, parallel-connected or series-connected circuits may be provided at will, as well as any other rational combination of these two types of circuits.

The applicant also contemplates the possibility of utilizing, with at least one of the vats constituting the subject-matter of this invention, either one or a plurality of larger, equal or smaller vats of the same type, or one or a plurality of larger, equal or smaller vats of another type, whenever this arrangement is likely to bring useful industrial effects. On the other hand, a smaller vat may also be constructed within a larger one made in accordance with the teachings of this invention.

FIGURE 8 illustrates by way of example an arrangement of this character wherein three equal or unequal vats 37, 38 and 39 of the type incorporating the features set forth hereinabove comprise each three or four annular segments or sectors for guiding the liquid mass, these vats being tangent to each other as shown with their wall portions free of any annular sector contacting each other and being formed with apertures 44 (between vats 37 and 38 on the one hand and vats 37 and 39 on the other hand) whereby these paired vats are in fluid connection at their top and/or bottom portions.

If desired, the adjustment of the operating parameters of vat 37 may differ from those of vats 38 and 39.

Figure 9:
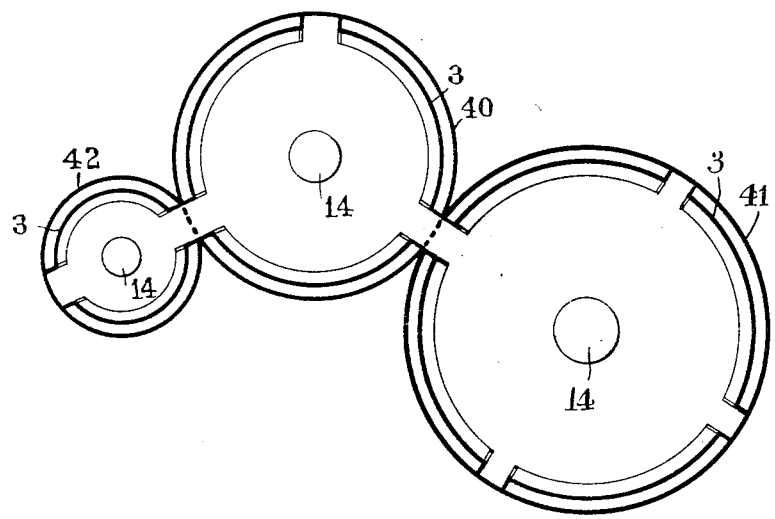

Besides, an arrangement wherein all the vats differ in size from one another may be provided, as shown by way of example in FIGURE 9 (vats 40, 41 and 42).

Under these conditions, it is clear that widely differing vat arrangements may be contemplated without departing from the spirit and scope of the invention.

To simplify the drawings, FIGURES 8 and 9 show only diagrammatically the horizontal cross-sections of the inner walls 3 and of the lateral main walls of the vats concerned, as well as the vertical partitions at the ends of the resulting annular sectors.

Although specific forms of embodiment of the present invention have been shown, described and suggested herein, it will readily occur to anybody conversant with the art that many modifications and variations may be resorted to in practice without departing from the spirit and scope of the invention as set forth in the appended claims.

What I claim is:

1. A device for stirring and methodically circulating liquid masses by blowing gas therethrough, which comprises a vat having a lateral main wall, approximately in the lower half of said vat a coaxial inner partition connected through vertical flat members to said lateral main wall, said inner partition being so spaced from said lateral main wall as to constitute an annular duct therebetween of a width ranging from about 6% to about 14% of the tranverse dimensions of said vat, the lower portion of said inner partition being curved inwards and downwards and having its lower edge disposed at a relatively short distance from the bottom of said vat, means for delivering gas under pressure, gas outlets connected to said means, opening into the bottom of said annular duct and so spaced and dimensioned as to deliver the same amount of gas for each linear yard of the vat periphery.

2. A device for stirring and methodically circulating liquid masses by blowing gas therethrough, which comprises a vat having a lateral main well, approximately in the lower half of said vat a coaxial inner partition connected through vertical flat members to said lateral main wall, said inner partition being so spaced from said lateral main wall as to constitute an annular duct therebetween of a width ranging from about 6% to about 14% of the transverse dimensions of said vat, the lower portion of said inner partition being curved inwards and downwards, and having its lower edge disposed at a relatively short distance from the bottom of said vat, means for delivering gas under pressure, gas outlets connected to said means, opening into the bottom of said annular duct and so spaced and dimensioned as to deliver the same amount of gas for each linear yard of the vat periphery, and a drawing-off pipe line connected to said vat in the vicinity of the bottom thereof, and a feed device opening into said annular duct above the gas blowing zone.

3. A device for stirring and methodically circulating liquid masses by blowing gas therethrough, which comprises a vat having a lateral main wall, a conical bottom tapering upwards and towards the center, segments forming in the lower half of said vat a discontinuous inner coaxial partition forming with said lateral main wall an annular duct communicating with the center of said vat and of a width ranging from about 6% to about 14% of the transverse dimesions of said vat, the base of said segments being disposed at a relatively short distance from the vat bottom and curved inwards and downwards, the top of said segments being curved inwards and upwards, vertical flat wall elements for securing said segments to the inner surface of said lateral main wall, at least one pipe line for delivering gas under pressure, suitably shaped primary gas outlet orifices connected to said gas delivery pipe line which are properly spaced disposed at the base of said annular duct, a drawing-off pipe line connected to a point located in the vicinity of the vat bottom, at least one feed device opening into said annular duct, suitably shaped inlet orifices for said feed device above the gas blowing zone of said vat.

4. A device for stirring and methodically circulating liquid masses by blowing gas therethrough, which comprises a vat having a lateral main wall, a conical bottom tapering upwards and towards the center, segments forming in the lower half of said vat a discontinuous inner coaxial partition forming with said lateral main wall an annular duct communicating with the center of said vat and of a width ranging from about 6% to about 14% of the transverse dimensions of said vat, the base of said segments being disposed at a relatively short distance from the vat bottom and curved inwards and downwards, the top of said segments being curved inwards an upwards, vertical flat wall elements for securing said segments to the inner surface of said lateral main wall, at least one pipe line for delivering gas under pressure, suitably shaped primary gas outlet orifices connected to said gas delivery pipe line which are properly spaced, disposed at the base of said annualar duct, a drawing-off pipe line connected to a point located in the vicinity of the vat bottom, at least one feed device opening into said annular duct, suitably shaped inlet orifices for said feed device above the gas blowing zone of said vat, and at least one secondary gas blowing pipe line connected to outlets overlying said primary gas outlet orifices 5. Device for stirring and methodically circulating liquid masses by blowing gas therethrough, which comprises a vat, a puralty of segments forming in the lower half of said vat an inner coaxial partition, vertical walls connecting said segments to the lateral wall of the vat, the annular duct provided between the inner partition and the lateral wall of the vat being thus divided into a plurality of segments and the gaps formed between said segments communicating directly with the central portion of said vat, a device for delivering gas under pressure opening into the lower portion of said annular duct through gas blowing orifices so disposed and dimensioned as to deliver the same amount of gas for each linear yard of each annular duct segment of the vat periphery and said duct having a width ranging from about 6% to about 14% of the transverse dimensions of said vat.

6. Plant for stirring and circulating liquid masses by blowing gas therethrough, which comprises a plurality of vats as set forth in claim 5 which communicate with one another through said gaps formed between said duct segments.

7. A method of stirring and methodically circulating liquid masses by blowing gas therethrough, wherein said gas is blown into the liquid mass at the base and near the outer periphery thereof so as to distribute said gas as uniformly as possible along said periphery and form a liquid-gas emulsion thereat, whereby the movement of said liquid mass thus circulated takes place upwards at the periphery and downwards in the central zone, said emulsion constituting at the outer periphery of said liquid mass an annular ascending sheet pouring continuously at the upper portion of said liquid mass into the central portion thereof, and confining said sheet so that its width ranges from about 6% to about 14% of the transverse dimensions of said liquid mass.

8. A method as set forth in claim 7, wherein the gas is introduced at the rate of 30 to 75 feet/second, without attempting to reduce the gas in a state of fine division.

9. A method as set forth in claim 7, wherein said liquid mass is treated continuously by being drawn and fed continuously, the feeding of said liquid mass being distributed along its periphery, slightly above and in contact with the blown gas, in the zone of initial and tumultuous ascension of said gas, whereby said feed is from the onset uniformly distributed into said liquid mass.

10. A method as set forth in claim 7, wherein a secondary gas blowing action is also provided with the same characteristics as the main blowing action, but at a slightly higher level into the ascending annular sheet.

11. A method as set forth in claim 7, wherein said annular ascending sheet is divided into a plurality of sectors spaced along the outer periphery of said liquid mass.

12. A method as set forth in claim 11, wherein said liquid mass is treated continuously by being drawn and fed continuously, the feeding of said liquid mass being distributed along its periphery, slightly above and in contact with the blown gas, in the zone of initial and tumultuous ascension of said gas, whereby said feed is from the onset uniformly distributed into said liquid mass.

13. A method as set forth in claim 11, wherein a secondary gas blowing action is also provided with the same characteristics as the main blowing action, but at a slightly higher level into the ascending annualar sheet.

References Cited

UNITED STATES PATENTS

| | | |
|---|---|---|
| 919,249 | 4/1909 | Ruddiman. |
| 1,988,766 | 1/1935 | Aldridge. |
| 2,077,445 | 4/1937 | Wallace et al. |
| 3,054,602 | 9/1962 | Proudman _____ 261—124 X |
| 3,218,133 | 11/1965 | Ebner _____ 261—123 X |
| 3,243,169 | 3/1966 | Caudle et al. _____ 261—124 X |

HARRY B. THORNTON, *Primary Examiner.*

TIM R. MILES, *Assistant Examiner.*